United States Patent [19]
Genske et al.

[11] Patent Number: 4,778,697
[45] Date of Patent: Oct. 18, 1988

[54] POLYMERIC FILMS

[75] Inventors: Roger P. Genske; Yong J. Kim; Russell P. Gehrke, all of Neenah; Richard E. Johnson, Jr., Appleton, all of Wis.; R. Daniel Webster, Barrington; Leonard F. Czuba, Lombard, both of Ill.

[73] Assignees: American National Can Company, Greenwich, Conn.; Baxter Travenol Laboratories, Inc., Deerfield, Ill.

[21] Appl. No.: 802,877

[22] Filed: Nov. 29, 1985

[51] Int. Cl.$^4$ .................. B32B 1/02; B32B 27/08
[52] U.S. Cl. .................. 428/35; 428/349; 428/355; 428/516
[58] Field of Search .................. 428/349, 516, 35, 355, 428/347

[56] References Cited

U.S. PATENT DOCUMENTS

| | | | |
|---|---|---|---|
| 4,125,662 | 11/1978 | Weiner et al. | 428/214 |
| 4,147,827 | 4/1979 | Breidt et al. | 428/218 |
| 4,169,910 | 10/1979 | Graboski | 428/35 |
| 4,210,686 | 7/1980 | Gajewski et al. | 428/516 |
| 4,479,989 | 10/1984 | Mahal | 428/35 |

FOREIGN PATENT DOCUMENTS 2072744  6/1977  Japan .................. 525/240

*Primary Examiner*—Edith Buffalow
*Attorney, Agent, or Firm*—Paul R. Audet; Thomas D. Wilhelm

[57] ABSTRACT

This invention pertains to the use of polymer blends in making multiple layer films. In some layers, the elastomer or ethylene-based copolymer is blended with polypropylene, and in some layers, with polyethylene. Typical films have two to five layers. In multilayer films, at least one layer of a blend of polyethylene, preferably high density polyethylene, with elastomer and/or ethylene-based copolymers. Another layer is polypropylene blended with elastomers and/or ethylene-based copolymers. The films may have as few as two layers, one each having polypropylene and polyethylene, preferably high density polyethylene. Additional layers may be added to the two or three layer films taught herein, for variety of purposes.

66 Claims, 3 Drawing Sheets

POLYMERIC FILMS

BACKGROUND OF THE INVENTION

Polypropylene provides excellent resistance to high temperature processing, such as at retort conditions of about 250° F. for about 30 minutes. Polypropylene has thus found widespread use, particularly as a sealant layer in pouches which are subjected to heat treatment after the pouch is filled with product and sealed. While polypropylene has been accepted as the material of choice for use in sealant layers of retortable pouches, it has been selected more or less by necessity, as few other materials in the same general price range can provide similar high temperature processability. Likewise, for some uses such as contact with food or medical solutions, polypropylene is among the few materials which is approved for product contact. Thus, polypropylene provides a combination of desirable properties which is not found in other known materials.

Polypropylene does have some undesirable properties associated with it. Most prominent in packages is the tendency of the polypropylene to be brittle, and to be even more brittle after it has been retort processed. The degree of brittleness of a package film is most easily detected by measuring the capability of a package to withstand physically stressful treatment. Brittleness of the overall packages is a property which is a composite of the brittlenessess of the individual layers, interfacial bond strengths, the elasticity of adjacent layers and their capability to absorb and dissipate physical shock, and any overwhelming brittleness of any one layer.

The composite brittleness of retort processed packages using polypropylene is usually observed as the fraction of the filled and sealed packages which fail after being subjected to physical stress or shock.

Polyethylenes in the density range of about 0.91 to about 0.965, and linear low density polyethylene (LLDPE) have many fine and desirable properties which make them particularly suitable for many uses. Polyethylene ("PE") as used herein is defined as those polyethylenes, homopolymer and copolymer, which have a density in the range of about 0.91 to about 0.965, and LLDPE. Many PE's are stiff and rigid, able to hold shape in thick sections. PE is readily processed and formed in both the solid form and the more fluid plasticated form. It is relatively economical for many uses. In packaging applications it has been found to provide a good barrier to transmission of water vapor. And it is particularly the packaging application which is of interest to the inventors herein, while it will be seen that other applications may abound.

It would be desirable to combine layers of polypropylene and PE and, in particular, high density polyethylene (HDPE having a density greater than about 0.94), into one packaging structure to obtain the combined properties of high temperature processability, a strong heat seal and resistance to water vapor transmission at moderate thickness. The package should also have excellent resistance to physical shocks.

Polypropylene and PE layers may be combined into a multiple layer film as by adhesive lamination. Such a construction, though, has undesirable cost disadvantage of the plurality of steps necessary in its fabrication. Further, such films do tend to exhibit the brittleness of polypropylene. The brittleness may be somewhat improved upon by using a polypropylene copolymer rather than a homopolymer. While there is some improvement in performance, the general level of brittleness prevents widespread use of such structures.

If, however, an economical structure could be made which would combine the desirable properties of polypropylene and PE while improving on the ability of the package to withstand physical abuse, and to resist peeling of the heat seals, such a package may find substantial utility and acceptance. Such a structure may use blend compositions in one or more layers, and might use particular combinations of compositions, layers and positional relationships to achieve the balance of properties desired.

Thus it is an object of this invention to provide novel multiple layer films made from compositions of polymers.

It is a particular object to provide novel multiple layer films suitable for use in retortable packages, which packages have excellent resistance to rupture, and to peeling of heat seals, when subjected to shock abuse, both before and after retort processing.

A direct object is to provide closed and sealed packages using combinations of layer compositions of the invention.

SUMMARY OF THE DISCLOSURE

One embodiment of the invention is seen in a family of novel multiple layer films. A first layer of the films is a blend of a first component of polypropylene, a second component which is an ethylene-based copolymer, and a third component. The composition of the third component is different from the composition of the second component.

The second component is an ethylene-based copolymer which consists essentially of ethylene copolymerized with moieties of a second molecule, the composition of said second molecule being selected from the group consisting of propylene and butene-1. (Hereinafter, said ethylene-based copolymers are sometimes referred to as "EBC".) Preferably the EBC consists essentially of an ethylene copolymerized with moieties of a second molecule, the copolymer being about 10 to about 95 mole percent ethylene and about 90 to about 5 mole percent of the moieties of the second molecule, and the composition of the second molecule is either propylene or butene-1. Where butene-1 is the second moiety, an especially preferred composition is about 85 to about 95 mole percent ethylene and about 15 to about 5 mole percent butene-1. Where propylene is the second moiety, an especially preferred composition is about 50 to about 70 mole percent ethylene and about 50 to about 30 mole percent propylene.

The third component may be a more conventional EBC, or may be an elastomer, such as polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer, (hereinafter, the aforesaid group of materials is sometimes referred to as the "Modifiers".) The terms "elastomer" and "elastomeric" describe polymers, copolymers, rubbers, and the like, which at room temperature can be stretched substantially under low stress, and upon immediate release of the stress, have the tendency to return generally to approximately the original shape.

A second layer of the film is adhered on one of its surfaces to the first layer. The composition of the second layer is a blend of PE (preferably, HDPE) and one of the materials of the aforesaid Modifiers. While composition of any given film may be designed with substantial freedom within these parameters, there are preferred ranges of composition for each component of each layer and there are preferred ranges of combinations.

The first component in the first layer is preferably present in an amount of about 40% to about 70% by weight.

In preferred composition, the second component in the first layer is EBC and is present in an amount of about 10% to about 40% by weight.

The amount of the third component present in the first layer is preferably about 5% to about 35% by weight.

Regarding the second layer, the PE is desirably present in an amount of about 50% to about 90% by weight, in order to take advantage of the several benefits of having a high fraction of that component in the composition. The second component generally provides resilience. In preferred composition that provides adequate resilience while leaving room for the contribution of the properties of material forming the balance of the composition, the second component in the second layer is present in an amount of about 5% to about 35% by weight.

In some embodiments, the second layer also has a third component, which is one of the Modifiers. Preferably, it is present in an amount of about 2% to about 50% by weight. While the third component of the second layer has the same general description as the third component of the first layer, and while those components may have the same composition, it is entirely acceptable that different specific compositions be selected for those two components, so long as they are within the composition ranges as described hereinabove. In those embodiments where the second layer includes a third component, the second component is preferably EBC. Similarily, as in the first layer, the composition of the third component is different from the composition of the second component.

Finally, in some preferred embodiments of the invention, the multiple layer films have a third layer adhered on the other surface of the second layer. The composition of the third layer preferably is a blend of polypropylene and EBC. The third layer may take on all the compositional variations of the first layer, including the third component, and its composition may indeed be the same as the first layer. Alternatively, it may have only two components, or may have a different composition from that of the first layer.

Further, it is within the scope of this invention to provide films with more than three layers wherein additional layers may be adhered to either of the outside surfaces of the first and third layers of the aforesaid three-layer structure. Preferably, such additional layers are of the same composition as the first, second or third layers of the three-layer structure.

Finally, the invention is embodied in packages made from the films of the invention. Typical packages are formed and closed by means of heat seals, though other means of forming and closing the packages are contemplated.

DETAILED DESCRIPTION OF THE DISCLOSURE

The invention encompasses a variety of articles which can be formed such as by extruding or otherwise molding multiple layer films. Such films are typically thin and flexible, being of the order of about 1 mil to about 8 mils thick. Thicker sections and shapes may also be formed, as for other uses.

Preferred embodiments are those wherein three layer film is fabricated from two layers of polypropylene blends and one layer of a PE blend. In these embodiments, the polypropylene layers are affixed in surface-to-surface contact with the PE layer, on opposing surfaces thereof. Intervening adhesives need not be used.

Yet other embodiments of the invention are those wherein two layer films are fabricated from one layer of a polypropylene blend and another layer of a PE blend. In these embodiments, the polypropylene layer and the PE layer are affixed to each other, in face-to-face contact with each other, with good adhesion.

Figure 1:
FIG. 1 is a cross-section of a two layer film of this invention.

Turning now to the drawings, FIG. 1 represents a cross-sectional view of a two layer film of the invention. Layer 12 is a blend of a polypropylene, an EBC and a Modifier.

Layer 14 is a blend of a PE, a first Modifier, and optionally, a second Modifier. Where the second Modifier is used, namely as the third component, the composition of the second component is different from the composition of the third component.

Films of the embodiments of FIG. 1 may be used for making packages wherein either layer 12 or layer 14 is on the outside, or conversely on the inside of a package made therefrom. The selections of specific polymers, blend compositions, and layer thicknesses and ratios depend on the end use contemplated.

Figure 2:
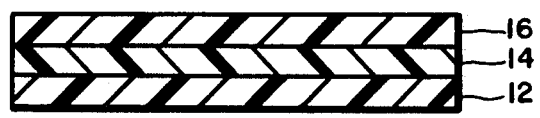
FIG. 2 is a cross-section of a three layer film of this invention.

FIG. 2 represents a cross-sectional view of a three layer film which is a preferred embodiment of the invention. As in the two layer embodiment of FIG. 1, layer 12 is a blend of polypropylene, EBC and one of the Modifiers. Likewise layer 14 of FIG. 2 is, like layer 14 of FIG. 1, a blend of a PE, a first Modifier, and, optionally a second Modifier. Layer 16 is a blend of polypropylene, a first Modifier, and, optionally, a second Modifier. Where a second Modifier is used, namely as the third component, the composition of the second Modifier is different from the composition of the first Modifier.

Figure 6:
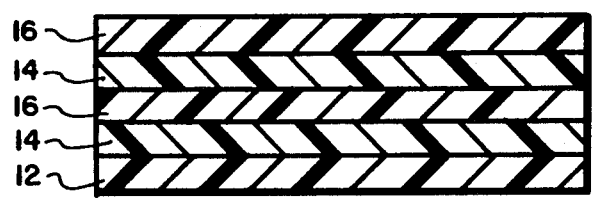
FIG. 6 is a cross-section of a five-layer film of this invention.

FIG. 6 illustrates a five layer film of this invention comprising layers 12, 14, 16, 14 and 16. The composition of each layer is the same as the composition of the like-numbered layer previously described.

Figure 3:
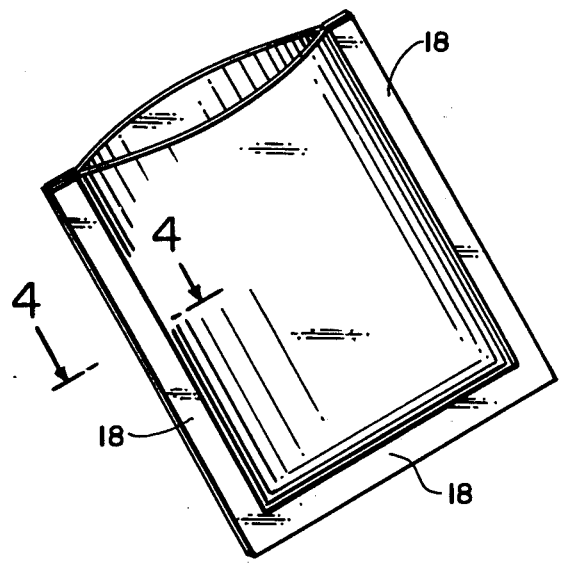
FIG. 3 is a pictorial view of a typical pouch-type package made from films of the invention.
Figure 5:
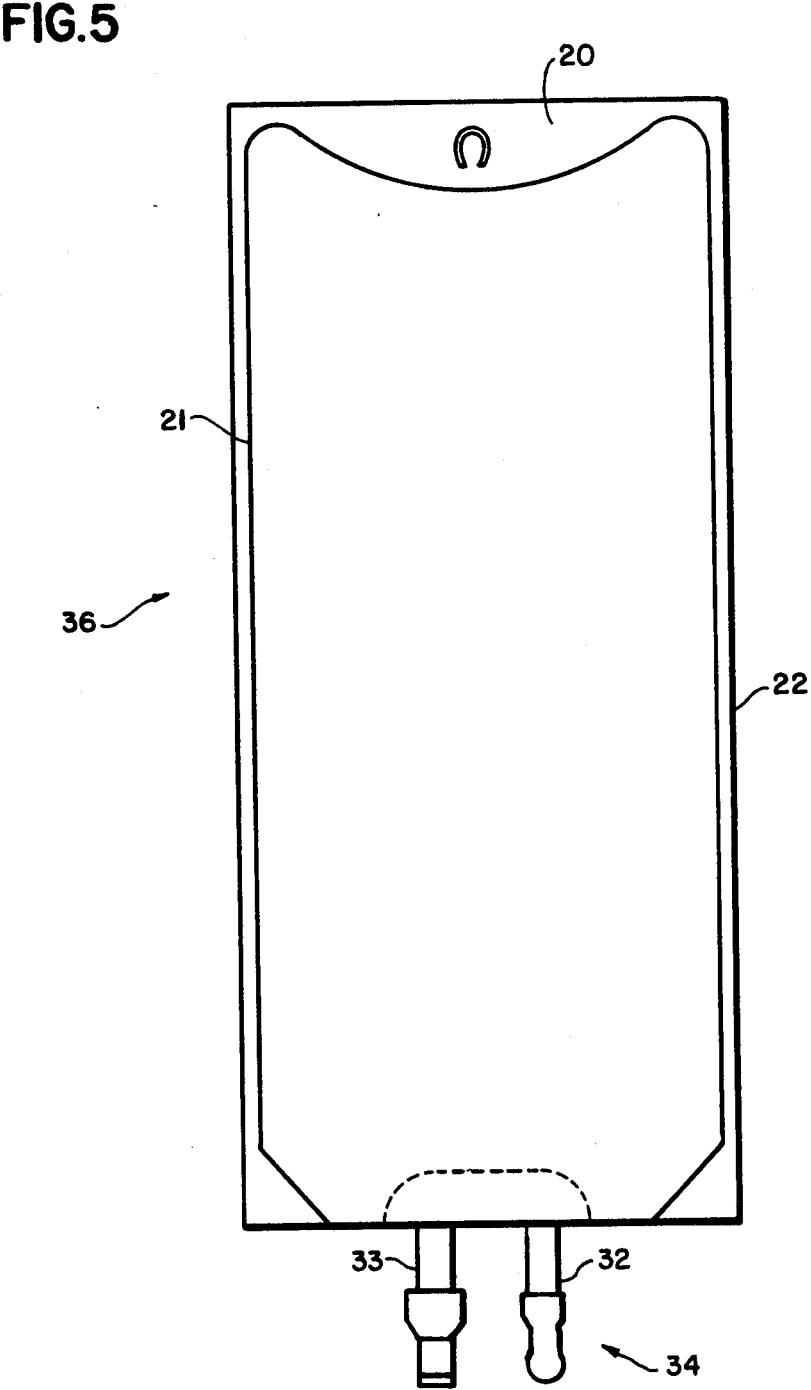
FIG. 5 is a pictorial view of a preferred pouch-type package made from films of the invention.

The multilayer films of FIGS. 1, 2 and 6 are especially useful for making pouches such as those seen in FIGS. 3 and 5. In one preferred method of formation of a pouch, as illustrated in FIG. 3, portions of the film are brought in face-to-face contact with each other such that the layers 12 on both of the facing portions are facing each other. Heat seals 18 are formed about the common periphery of the facing portions to make an enclosed package capable of holding a product. After product is inserted into the package, a final heat seal is made across the open end to close and seal the package.

An example of an apparatus for forming packages from the films of the present invention is a form, fill and seal packaging machine (not shown). In a typical form, fill and seal packaging machine the film is fed into the machine to a former for folding the web of film. The former is typically situated so that the sheet is folded around a dispensing tube. To create a sealed pouch, as shown in FIG. 5, the packaging machine includes two sealing stations. At one sealing station an end seal 20 is created in the film, and at the second sealing station a first side seal 21 is created in the film, thereby to form a pouch like container with one open side. The product to be housed is then dispensed into the pouch and a second side seal 22 is created to seal the open side to thereby enclose the product. After the second side seal 22 is created the film is severed and a filled flexible container 36 is thereby created as shown in FIG. 5.

Also, as illustrated in FIG. 5, fitments 32 and 33 (which preferably are a single unit 34) may be sealed to the inside or outside layer of the container 36. Preferably, the fitment 34 is heat sealed to the inside layer 12. Due to the construction of the inside layer 12, a strong heat seal is created.

Thus, the present invention creates films that can run through form, fill and seal packaging machines to create flexible containers 36 including a fitment 32 that can house a medical product to be maintained and extracted under sterile conditions.

Referring specifically to the overall thickness of the multilayer films of FIGS. 1, 2 and 6, while they may be as thin as about 1 mil, they are preferably between about 2 mils and about 8 mils thick. The lesser thickness of about 2 mils represents about the thinnest film which has good tolerance for the shock abuse typical in commercial handling of packages filled with a liquid product. The greater thickness of about 8 mils provides a film having essentially as much strength as can be achieved economically in a flexible package. While greater film thicknesses are possible, are functional, and are included in the invention herein, they are generally more costly, and so are not preferred.

In the overall film structures described, layer 12 is the layer which is used as the inside surface layer, and to form the heat seals where the film is used in a heat sealed package. For these applications, the heat seal layer 12 should be at least about 1 mil thick, to facilitate formation of strong heat seals.

Preferably, layer 12 has a thickness of approximately 3 mils to about 4½ mils thick. In a preferred embodiment of films having multiple layers, layer 12 comprises approximately 60% of the total thickness of the film. This provides a film that has good durability and forms excellent heat seals. Moreover, this thickness maximizes the sealant layer relevant to the maximum thickness of the film, while still achieving balanced film properties.

Layer 14 functions primarily as an effective barrier to infusion of moisture vapor. For this function, it should be at least about 0.5 mil thick.

The role of layer 14 is primarily that of providing an efficient barrier to transmission of moisture vapor within an overall package structure which is flexible.

With regard to the barrier to transmission of water vapor, the olefins, and indeed such as the polypropylenes in layers 12 and 16 are generally considered to provide good barrier to moisture vapor. However for products which are especially sensitive to transmission of moisture vapor, most olefins may be used only by providing excessively thick layers to serve the moisture barrier function. Such thick layers, while they do provide the moisture vapor barrier, they also make the overall film so thick that it is deficient in resilient flexibility, and thus may not possess good shock abuse resistance. Further, thicker films are prohibitively costly. We have discovered that an optimum solution is achieved by selecting HDPE for layer 14 to provide the moisture vapor barrier which, in combination with one or more modifiers, provides an economical barrier with acceptable stiffness. A thickness of about 1 mil to 1½ mils is preferred for layer 14. This preferred thickness provides a multilayer film that has good clarity and flexibility while still providing a water vapor barrier. In a preferred embodiment of a three layer film, layer 14 comprises approximately 20% of the total thickness of the multilayer film.

The polypropylene which is used as the first component of the blend compositions of layers 12 and 16 provides much of the strength in the sheet structure as well as capability to withstand high temperature without excessive softening. The inclusion of EBC and/or the Modifiers in the blend compositions provide resilience to the blend composition.

Any of the polypropylenes may be used as the first component of the blend compositions of layers 12 and 16. The term "polypropylene" as used herein includes both homopolymers and copolymers except where stated otherwise. Polypropylenes which are copolymers having about 2 to about 8 mole percent ethylene are preferred, as the copolymer provides some minimum contribution of additional resilience to the polypropylene, as compared to a homopolymer. Whether the polypropylene is a homopolymer or a copolymer, its resilience as demonstrated herein whether having been retort processed, or not retort processed, is enhanced substantially by the incorporation of the Modifiers. Without the incorporation of the Modifiers, the polypropylene is at least somewhat brittle, whether homopolymer or copolymer. And while polypropylene homopolymer is fully satisfactory for some uses, the polypropylene copolymer is generally preferred, as it evidences, in the blend compositions and layer combinations, the optimum properties of tolerance of shock abuse in combination with the capability to withstand elevated processing temperatures.

The EBC component of layer 12 is essentially a copolymer of two moieties, both moieties being present in the main chain of the polymer. The overall mole ratio is about 10 to about 95 mole percent ethylene, and conversely about 90 to about 5 mole percent of the second moiety. The ethylene is preferably compolymerized with either propylene or butene-1. In the case of propylene, the mole ratio preferred range is about 30% to about 50% propylene and about 70% to about 50% ethylene. One such material is sold by Mitsui Petrochemical Industries, Ltd. as TAFMER P. In the case of butene-1, the mole ratio is most preferably within the range of about 5% to about 15% butene-1 and about 95% to about 85% ethylene. One such material is sold by Mitsui Petrochemical Industries, Ltd. as TAFMER A. Tafmer P is elastomeric. Tafmer A provides some properties representative of elastomers, as seen from the following examples herein.

While virtually any amount of EBC does provide some improvement in the properties of polypropylene, significant improvement is seen at as little as about 2% of the EBC in blend compositions of polypropylene; so this is generally considered a lower practical limit for the second component in blend compositions of layer 12 with a lower limit of about 10% being preferred. While up to about 70% of the blend composition may be EBC, such blends tend to have some reduction in tolerance of high temperatures, such as in the retort process, and so are less preferred, with about 50% of EBC generally representing the upper limit of ethylene-based copolymer in the preferred compositions used for layer 12.

Any of the Modifiers are functional for use as the third component in the composition of each of the layers 12, 14, and 16 which use a third component. Indeed, for any given composition, it is also acceptable to select, for the material of the third component from among those materials identified herein as acceptable for use as the second component in layer 12 so long as the same materials are not used for the second and third components of the same layer which would negate their separate identity.

In preferred embodiments of the films of the invention, EBC is used as the second blend component in each of the first, second and third layers. This commonality facilitates coextrusion processing due to the common component, and adhesion at the layer interfaces is enhanced by the common component.

Figure 4:
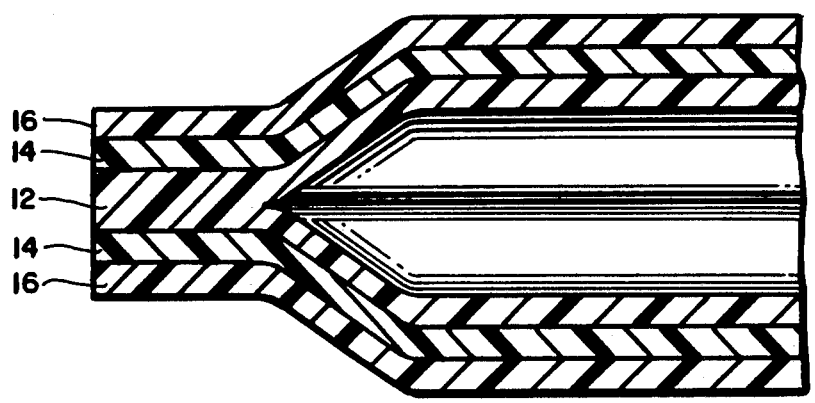
FIG. 4 is an enlarged cross-section of a portion of the pouch of FIG. 3, and taken at 4—4 of FIG. 3.

Layer 16 is typically used as the outside layer of the package as seen in FIGS. 4 and 6. As such, it serves a primary function of providing resistance to penetration of the package as by puncture, cutting or abrasion. The abrasion resistance of layer 16 improves the appearance of the package created from the film. To serve this function, it requires a degree of physical substance in terms of thickness, and about 0.5 mil is usually the minimum thickness which will provide this functional performance, so this is a preferred minimum thickness. For most typical applications, though, layer 16 is somewhat thicker, and a thickness of approximately 1 mil to about 1½ mil is generally preferred. In a preferred embodiment of a three layer film, layer 16 comprises 20% of the total thickness of the multilayer film. A secondary function of layer 16 is in its surface properties as they relate to other surfaces which it contacts in various machining operations, and as it is brought into contact with surfaces of other films or packages. As regards machining operations, sufficient friction is needed to enable drawing the film through packaging machines. However, high levels of friction are often associated with blocking, or sticking, of films together. Conventional slip and anti-block additives may be used as needed in any of the film layers, but are particularly applicable to layers 12 and 16, most particularly to layer 16.

In the three and five layer structures, the composition of each of the layers 12, 14, and 16 is a blend of polymer with EBC and/or a Modifier. The effect of such blending into the layers is seen in a plurality of beneficial evidences. First, the interfacial adhesion between the PE layer and adjacent polypropylene is enhanced by the inclusion of EBC and/or Modifiers in each of the layers. Second, the ability of packages fabricated from the multiple layer films of the invention to tolerate shock abuse, both before and after retort processing, is higher than for similar films which do not include EBC and/or Modifiers in at least the composition of one layer.

While the precise nature of the role of the third component is not entirely understood, experimental observations have shown that the presence of the third component is instrumental in enabling packages to withstand shock abuse.

As a minimum criterion of the invention, the multiple layer films of the invention contain at least two layers. Each of the two layers is a blend. The first layer is a blend of the components, which are olypropylene, EBC and a Modifier. The second layer is a blend of PE, a Modifier, and, optionally, a second Modifier. In those embodiments having a third layer, such as layer 16 in FIG. 2, the third layer is a blend of polypropylene, a second component which is a Modifier, and optionally a third component which is a Modifier.

The use of a third component in either layers 14 or 16 is determined separately for each anticipated end use. The increased scope of desirable properties achievable by using the third component in each of either layers 14 or 16 is weighed against the increased complexity and associated costs of its use.

Generally speaking, the incorporation of virtually any amount of the third component into the blend composition of any of the layers 12, 14 or 16, provides some benefit. Improvements are especially detectable at a level of about 2% by weight. And while up to about 50% may be used in layer 14, and up to about 60% may be used in layers 12 and 16, the most desired balance of properties is achieved when the third component is present in an amount of about 10% to about 30% by weight, making this the preferred amount of the third component in any of the layers so defined.

A substantial benefit of the invention is seen in the enhanced adhesion which may be obtained at the layer interface between a polypropylene layer and a PE layer wherein both layers have a Modifier as herein defined. A most preferred structure is one where at least one Modifier is common to the blend compositions of both adjacent layers. It is, however, highly acceptable, and typical, that different fractions of the Modifier compositions be used in the different layers.

By way of illustration of the improvement in interlayer adhesion, a coextrusion was made of a first two layer film where the first layer 12 was a blend of 60% polypropylene copolymer and 40% TAFMER A, and the second layer 14 was a blend of 70% high density polyethylene and 30% TAFMER A. For comparison, a second two layer film was similarly coextruded with the first layer being polypropylene copolymer and the second layer being high density polyethylene, both layers being without a Modifier. Both films were tested for adhesion. The film without Modifier had about 100 grams of adhesion per inch width between layers. In the film with the Modifier, the layers could not be separated by the same conventional peel test.

THE EXAMPLES

In order to demonstrate the shock abuse tolerancce of the films of this invention, an extensive series of experiments was performed on a wide variety of two layer and three layer films of the invention. The films were formed into bags by a conventional heat sealing process. For each structure represented, a plurality of bags were made from the so-formed film, and filled with approximately 1 liter of water. For each structure represented, some of the bags were retort processed at about 250° F. for about 30 minutes, and some were not. Finally, the bags for each structure were tested for shock abuse by dropping them in a free fall onto a hard surface from heights up to about 12 feet until a drop height was found which caused them to fail either by rupture or by significant weakening of the seals. The last successful drop height was then recorded as the maximum drop height, and is represented in the following Table 1 as indicative of shock abuse tolerance of that film. Those structures which successfully tolerated the 12 foot drop were reported as 12 feet and were not further tested.

In the experiments, the ratio of the thicknesses of the layers in the two layer films was about 70% in the polypropylene sealant layer and about 30% in the HDPE layer.

In the three layer films, the sealant layer was about 60% of the thickness, and the other two layers were each about 20%. As one exception, in EXAMPLE NUMBER 11, the sealant layer was about 40% of the thickness, the outer layer was about 20% and the middle layer was about 40%. In general, all the films were nominally about 6.5 mils thick. To generally demonstrate thickness variations, two of the EXAMPLES were made at about 4 mils thickness, namely EXAMPLES 6 and 20. Thinner films could, of course be made. Two films were also made thicker, at about 9 mils, namely EXAMPLES 26 and 22.

Table 1 following, shows the composition of each layer, for each structure in weight percent, and the maximum repeatably successful drop height for those bags which were retort processed as well as those which were not retort processed.

TABLE 1

MAXIMUM SUCCESSFUL DROP HEIGHT

| Example No. | Outer Layer | Middle Layer | Inner Sealant Layer | Drop Height, Feet Not Retort Processed | Retort Processed |
|---|---|---|---|---|---|
| Comparative 1 | 100% PPE | 100% HDPE | 100% PPE | 1 | <1 |
| 1. | 65% PPE 20% TA 15% SEBS | 90% HDPE 10% TA | 55% PPE 25% TA 20% SEBS | 12 | 12 |
| 2. | 20% PP 70% TA 10% SIS | 80% HDPE 20% SIS | 95% PPE 2% TP 3% SBS | 1 | <1 |
| 3. | 95% PPE 2% TP 3% PB | 40% HDPE 60% TP | 60% PPE 15% TP 25% SIS | 6 | 5 |
| 4. | 38% PPE 2% TA 60% TP | 60% HDPE 40% SEBS | 80% PPE 10% TA 10% EPDM | 9 | 8 |
| 5. | 50% PPE 25% TP 25% SBS | 70% HDPE 30% EPDM | 28% PPE 70% TA 2% SBS | 12 | 12 |
| 6. | 15% PIB 25% PPE 60% TP | 50% HDPE 50% EPDM | 70% PPE 15% TA 15% PB | 5 | 4 |
| 7. | 95% PPE 5% TA | 75% HDPE 25% TA | 45% PPE 35% TA 20% SEBS | 9 | 9 |
| 8. | 40% PP 60% TA | 98% HDPE 2% TA | 95% PPE 2% TA 3% SEBS | 2 | 1 |
| 9. | 90% PPE 10% TP | 90% HDPE 10% TP | 28% PP 70% TA 2% SEBS | 6 | 6 |
| 10. | 38% PIB 62% PPE | 80% HDPE 20% SEBS | 70% PPE 25% SIS 5% TP | 6 | 5 |
| 11. | 40% PPE 60% TP | 70% HDPE 30% EPDM | 20% PPE 40% TP 40% SBS | 8 | 8 |
| 12. | 70% PPE 30% PB | 50% HDPE 50% PB | 60% PPE 15% EPDM 25% TP | 12 | 6 |
| 13. | 80% PPE 20% EPDM | 85% HDPE 15% SIS | 30% PP 30% TP 40% TA | 12 | 9 |
| 14. | 65% PPE 35% SIS | 70% HDPE 30% TP | 50% TP 19% PIB 31% PPE | 12 | 9 |
| 15. | 65% PPE 20% TA 15% SBS | 80% HDPE 10% TA 10% SBS | 55% PPE 25% TA 20% SBS | 9 | 9 |
| 16. | 40% PPE 50% TA 10% EPDM | 96% HDPE 2% TP 2% PB | 23% PIB 37% PPE 40% TA | 12 | 9 |
| 17. | 95% PPE 2% TP 3% PB | 20% HDPE 60% TA 20% EPDM | 90% PP 5% TP 5% PB | 1 | 1 |
| 18. | 80% PPE 15% TP 5% TA | 40% HDPE 10% TP 50% SEBS | 70% PPE 10% TA 20% SIS | 8 | 8 |
| 19. | 25% PP 70% TA 5% G-1652 | 70% HDPE 20% TP 10% SBS | 45% PPE 25% TP 30% SBS | 12 | 12 |

TABLE 1-continued
MAXIMUM SUCCESSFUL DROP HEIGHT

| Example No. | Outer Layer | Middle Layer | Inner Sealant Layer | Drop Height, Feet Not Retort Processed | Drop Height, Feet Retort Processed |
|---|---|---|---|---|---|
| 20. | 70% PPE<br>7% TP<br>23% SIS | 50% HDPE<br>30% TA<br>20% SEBS | 80% PPE<br>15% TA<br>5% SEBS | 8 | 8 |
| 21. | 65% PPE<br>35% TA | 90% HDPE<br>5% TA<br>5% SEBS | 55% PPE<br>25% TA<br>20% SEBS | 12 | 8 |
| 22. | 80% PPE<br>20% TP | 80% HDPE<br>15% TP<br>5% SIS | 70% PPE<br>5% TP<br>25% SBS | 5 | 4 |
| 23. | 90% PPE<br>10% SEBS | 70% HDPE<br>10% TA<br>20% TP | 70% PPE<br>35% TP<br>5% SIS | 9 | 7 |
| 24. | 38% PIB<br>62% PPE | 80% HDPE<br>10% TA<br>10% TP | 50% PPE<br>10% TP<br>40% EPDM | 12 | 9 |
| 25. | 75% PPE<br>25% SBS | 80% HDPE<br>18% TP<br>2% PB | 65% PPE<br>25% TA<br>10% TP | 6 | *D |
| 26. | 50% PPE<br>50% SIS | 60% HDPE<br>30% TA<br>10% EPDM | 75% PPE<br>15% TA<br>10% PB | 8 | 6 |
| 27. | | 90% HDPE<br>10% TA | 55% PPE<br>25% TA<br>20% SEBS | 6 | 5 |
| 28. | | 98% HDPE<br>2% SEBS | 95% PPE<br>2% SEBS<br>3% TP | 4 | 4 |
| 29. | | 40% HDPE<br>60% TP | 25% PP<br>70% TA<br>5% TP | 7 | 7 |
| 30. | | 80% HDPE<br>20% SIS | 80% PPE<br>10% TA<br>10% PB | 5 | 5 |
| 31. | | 70% HDPE<br>30% EPDM | 30% PPE<br>10% TP<br>60% SEBS | 8 | *D |
| 32. | | 60% HDPE<br>40% PB | 30% PPE<br>40% TP<br>30% SBS | 8 | 6 |
| 33. | | 90% HDPE<br>5% TA<br>5% SEBS | 55% PPE<br>25% TA<br>20% SEBS | 6 | 6 |
| 34. | | 40% HDPE<br>50% TA<br>10% PB | 50% PPE<br>15% TP<br>35% SBS | 12 | 12 |
| 35. | | 70% HDPE<br>10% TP<br>20% SIS | 60% PPE<br>15% TA<br>25% EPDM | 12 | 10 |
| 36. | | 80% HDPE<br>5% TA<br>15% SBS | 70% PPE<br>10% TP<br>20% PB | 4 | 2 |
| 37. | | 90% HDPE<br>5% TP<br>5% SEBS | 80% PPE<br>5% TP<br>15% SEBS | 6 | 6 |

PP = polypropylene homopolymer
PPE = polypropylene copolymer
TA = Tafmer A
TP = Tafmer P
HDPE = high density polyethylene
SIS = styrene isoprene styrene copolymer
SBS = styrene butadiene styrene copolymer
PB = polybutylene
EPDM = ethylene propylene diene monomer terpolymer
PIB = polyisobutylene
SEBS = styrene ethylene butylene styrene copolymer
*D = Damaged during retort processing.

It is seen from Table 1, that a wide variety of Modifiers are demonstrated as suitable for use in the invention. Further the range of ratios of operable compositions is seen to be substantial. Some improvement in drop height, over Comparative Example 1, was seen with only minimal Modifier, as in EXAMPLE 8. Optimum results are seen in EXAMPLE 1, with decreasing performance as the compositions vary from the structure of EXAMPLE 1. A conclusion that can be reached from TABLE 1 is that similar results could be obtained from a variety of compositional combinations within the range of blend and structure parameters defined in TABLE 1. Further, because such a plurality of Modifiers have been demonstrated as acceptable for the third component, other Modifiers which exhibit similar elastomeric properties would be expected to function similarly if so tested.

Thus it is seen that the invention provides novel multiple layer films containing polypropylene and PE, which films are capable of withstanding increased levels of shock abuse. Indeed, the films of the invention are especially adapted for use in retortable packages in that the high levels of polypropylene lend particular capability to tolerate elevated processing temperatues of up to about 250° F. or more. Indeed, the films of the invention are excellent for use in making closed and sealed packages as so desired, such as for use as medical solution pouches and the like.

Having thus described the invention, what is claimed is:

1. A multiple layer film comprising:
   (a) a first layer, the composition of said first layer being a blend of (i) polypropylene, (ii) a second component, said second component providing elastomeric properties, and being selected from the group consisting of ethylene butene-1 copolymers and ethylene propylene copolymers, and (iii) a third component, the composition of said third component being a modifier having elastomeric properties the composition of said third component being different from the composition of said second component; and
   (b) a second layer having two surfaces, and being adhered, on one of said surfaces to said first layer, the composition of said second layer being a blend of (i) polyethylene and (ii) a second component, said second component being a modifier providing elastomeric properties representative of elastomers.

2. A multiple layer film as in claim 1 wherein said first component in said first layer is present in an amount of about 40% to about 70% by weight.

3. A multiple layer film as in claim 1 wherein said second component in said first layer consists essentially of an ethylene copolymerized with moieties of a second molecule, said copolymer being about 10 to about 95 mole percent ethylene and about 90 to about 5 mole percent of said moieties of said second molecule, the composition of said second molecule being selected from the group consisting of propylene and butene-1.

4. A multiple layer film as in claim 2 wherein said second component in said first layer consists essentially of an ethylene copolymerized with moieties of a second molecule, said copolymer being about 10 to about 95 mole percent ethylene and about 90 to about 5 mole percent of said moieties of said second molecule, the composition of said second molecule being selected from the group consisting of propylene and butene-1.

5. A multiple layer film as in claim 1 wherein said second componentof said first layer is about 85 to about 95 mole percent ethylene and about 15 to about 5 mole percent butene-1.

6. A multiple layer film as in claim 2 wherein said second component of said first layer is about 85 to about 95 mole percent ethylene and about 15 to about 5 mole percent butene-1.

7. A multiple layer film as in claim 1 wherein said second component of said first layer is about 50 to about 70 mole percent ethylene and about 50 to about 30 mole percent propylene.

8. A multiple layer film as in claim 2 wherein said second component of said first layer is about 50 to about 70 mole percent ethylene and about 50 to about 30 mole percent propylene.

9. A multiple layer film as in claim 1 wherein said second component in said first layer is present in an amount of about 10% to about 40% by weight.

10. A multiple layer film as in claim 2 wherein said second component in said first layer is present in an amount of about 10% to about 40% by weight.

11. A multiple layer film as in claim 3 wherein said second component in said first layer is present in an amount of about 10% to about 40% by weight.

12. A multiple layer film as in claim 2 wherein said second component in said first layer is present in an amount of about 10% to about 40% by weight.

13. A multiple layer film as in claim 1 wherein said third component in said first layer is present in an amount of about 5% to about 35% by weight.

14. A multiple layer film as in claim 2 wherein said third component in said first layer is present in an amount of about 5% to about 35% by weight.

15. A multiple layer film as in claim 3 wherein said third component in said first layer is present in an amount of about 5% to about 35% by weight.

16. A multiple layer film as in claim 5 wherein said third component in said first layer is present in an amount of about 5% to about 35% by weight.

17. A multiple layer film as in claim 7 wherein said third component in said first layer is present in an amount of about 5% to about 35% by weight.

18. A multiple layer film as in claim 12 wherein said third component in said first layer is present in an amount of about 5% to about 35% by weight.

19. A multiple layer film as in claim 1 wherein said polyethylene in said second layer is present in an amount of about 50% to about 95% by weight.

20. A multiple layer film as in claim 2 wherein said polyethylene in said second layer is present in an amount of about 50% to about 95% by weight.

21. A multiple layer film as in claim 5 wherein said polyethylene in said second layer is present in an amount of about 50% to about 95% by weight.

22. A multiple layer film as in claim 7 wherein said polyethylene in said second layer is present in an amount of about 50% to about 95% by weight.

23. A multiple layer film as in claim 9 wherein said polyethylene in said second layer is present in an amount of about 50% to about 95% by weight.

24. A multiple layer film as in claim 12 wherein said polyethylene in said second layer is present in an amount of about 50% to about 95% by weight.

25. A multiple layer film as in claim 1 wherein said second component in said second layer is present in an amount of about 5% to about 35% by weight.

26. A multiple layer film as in claim 2 wherein said second component in said second layer is present in an amount of about 5% to about 35% by weight.

27. A multiple layer film as in claim 5 wherein said second component in said second layer is present in an amount of about 5% to about 35% by weight.

28. A multiple layer film as in claim 7 wherein said second component in said second layer is present in an amount of about 5% to about 35% by weight.

29. A multiple layer film as in claim 9 wherein said second component in said second layer is present in an amount of about 5% to about 35% by weight.

30. A multiple layer film as in claim 19 wherein said second component in said second layer is present in an amount of about 5% to about 35% by weight.

31. A multiple layer film as in claim 24 wherein said second component in said second layer is present in an amount of about 5% to about 35% by weight.

32. A multiple layer film as in claim 1 and including, in said blend composition of said second layer, about 2% to about 50% by weight of a third component, said third component being a modifier having elastomeric properties, the composition of said third component in said second layer being different from the composition of said second component in said second layer.

33. A multiple layer film as in claim 5 and including, in said blend composition of said second layer, about 2% to about 50% by weight of a third component, said third component being a modifier having elastomeric properties, the composition of said third component in said second layer being different from the composition of said second component in said second layer.

34. A multiple layer film as in claim 9 and including, in said blend composition of said second layer, about 2% to about 50% by weight of a third component, said third component being a modifier having elastomeric properties, the composition of said third component in said second layer being different from the composition of said second component in said second layer.

35. A multiple layer film as in claim 13 and including, in said blend composition of said second layer, about 2% to about 50% by weight of a third component, said third component being a modifier having elastomeric properties, the composition of said third component in said second layer being different from the composition of said second component in said second layer.

36. A multiple layer film as in claim 19 and including, in said blend composition of said second layer, about 2% to about 50% by weight of a third component, said third components being a modifier having elastomeric properties, the composition of said third component in said second layer being different from the composition of said second component in said second layer.

37. A multiple layer film as in claim 21 and including, in said blend compsoition of said second layer, about 2% to about 50% by weight of a third component, said third component being a modifier having elastomeric properties, the composition of said third component in said second layer being different from the composition of said second component in said second layer.

38. A multiple layer film as in claim 23 and including, in said blend composition of said second layer, about 2% to about 50% by weight of a third component, said third component being a modifier having elastomeric properties, the composition of said third component in said second layer being different from the composition of said second component in said second layer.

39. A multiple layer film as in claim 26 and including, in said blend composition of said second layer, about 2% to about 50% by weight of a third component, said third component being a modifier having elastomeric properties, the composition of said third component in said second layer being different from the composition of said second component in said second layer.

40. A multiple layer film as in claim 30 and including, in said blend composition of said second layer, about 2% to about 50% by weight of a third component, said third component being a modifier having elastomeric properties, the composition of said third component in said second layer being different from the composition of said second component in said second layer.

41. A multiple layer film as in claim 1 and including a third layer adhered on the other said surface of said second layer, the composition of said third layer being a blend of (i) polypropylene and (ii) a second component, said second component being a modifier having elastomeric properties.

42. A multiple layer film as in claim 2 and including a third layer adhered on the other said surface of said second layer, the composition of said third layer being a blend of (i) polypropylene and (ii) a second component, said second component being a modifier having elastomeric properties.

43. A multiple layer film as in claim 12 and including a third layer adhered on the other said surface of said second layer, the composition of said third layer being a blend of (i) polypropylene and (ii) a second component, said second component being a modifier having elastomeric properties.

44. A multiple layer film as in claim 18 and including a third layer adhered on the other said surface of said second layer, the composition of said third layer being a blend of (i) polypropylene and (ii) a second component, said second component being a modifier having elastomeric properties.

45. A multiple layer film as in claim 19 and including a third layer adhered on the other said surface of said second layer, the composition of said third layer being a blend of (i) polypropylene and (ii) a second component, said second component being a modifier having elastomeric properties.

46. A multiple layer film as in claim 25 and including a third layer adhered on the other said surface of said second layer, the composition of said third layer being a blend of (i) polypropylene and (ii) a second component, said second component being a modifier having elastomeric properties.

47. A multiple layer film as in claim 27 and including a third layer adhered on the other said surface of said second layer, the composition of said third layer being a blend of (i) polypropylene and (ii) a second component, said second component being a modifier having elastomeric properties.

48. A multiple layer film as in claim 37 and including a third layer adhered on the other said surface of said second layer, the composition of said third layer being a blend of (i) polypropylene and (ii) a second component, said second component being a modifier having elastomeric properties.

49. A multiple layer film as in claim 41 and including, in said blend composition of said third layer, a third component, said third component being a modifier having elastomeric properties, said third component being different from said second component.

50. A multiple layer film as in claim 42 and including, in said blend composition of said third layer, a third component, said third component being a modifier having elastomeric properties, said third component being different from said second component.

51. A multiple layer film as in claim 43 and including, in said blend composition of said third layer, a third component, said third component being a modifier having elastomeric properties, said third component being different from said second component.

52. A multiple layer film as in claim 44 and including, in said blend composition of said third layer, a third component, said third component being a modifier having elastomeric properties, said third component being different from said second component.

53. A multiple layer film as in claim 45 and including in said blend composition of said third layer, a third component, said third component being a modifier having elastomeric properties, said third component being different from said second component.

54. A multiple layer film as in claim 46 and including, in said blend composition of said third layer, a third component, said third component being a modifier having elastomeric properties, said third component being different from said second component.

55. A multiple layer film as in claim 47 and including, in said blend composition of said third layer, a third component, said third component being a modifier having elastomeric properties, said third component being different from said second component.

56. A multiple layer film as in claim 48 and including, in said blend composition of said third layer, a third component, said third component being a modifier having elastomeric properties, said third component being different from said second component.

57. The invention of claim 41 wherein a fourth layer in adhered to said third layer, the composition of said fourth layer being a blend of (i) polyethylene and (ii) a second component, said second component being a modifier having elastomeric properties.

58. The invention of claim 57 wherein a fifth layer is adhered to said fourth layer, the composition of said fifth layer being a blend of (i) polypropylene and (ii) a second component, said second component being a modifier having elastomeric properties.

59. The invention of claim 57 wherein said blend of said fourth layer includes a third component, said third component being a modifier having elastomeric properties, the compositions of said second and third components being different.

60. The invention of claim 58 wherein said blend of said fifth layer includes a third component, said third component being a modifier having elastomeric properties, the compositions of said second and third components being different.

61. The invention of any one of claims 1–40 wherein said first layer comprises approximately 60% of the total thickness of the combination of the first and second layers, and said second layer comprises approximately 40% of said total thickness.

62. The invention of any one of claims 41–56 wherein said first layer comprises approximately 60% of the total thickness of said three layer film, the second layer comprises approximately 20% of said total thickness and the third layer comprises approximately 20% of said total thickness.

63. The invention of claim 59 or 60 wherein the first layer comprises approximately 60% of the total thickness of the multi-layer film.

64. The invention of any one of claims 1–60 wherein said polyethylene is high density polyethylene.

65. A package made from a multiple layer film of any one of claims 1–60.

66. A flexible container capable of housing a medical product to be maintained and extracted under sterile conditions made from a film of any one of claims 1–60.

* * * * *